United States Patent [19]

Peterson et al.

[11] 4,349,184

[45] Sep. 14, 1982

[54] LAMINATED BEARINGS HAVING ELASTOMER LAYERS OF VARYING DIMENSIONS

[75] Inventors: Robert R. Peterson, Hudson; Daniel S. Ventura, Malden, both of Mass.

[73] Assignee: Barry Wright Corporation, Newton Lower Falls, Mass.

[21] Appl. No.: 892,478

[22] Filed: Apr. 3, 1978

[51] Int. Cl.³ .................. F16F 1/36; F16C 27/00; F16C 33/00

[52] U.S. Cl. .................. 267/153; 248/634; 267/57.1 R; 267/63 R; 267/140.4; 267/141.1; 267/141.7; 285/223; 308/2 A; 308/26; 308/238; 403/228; 416/134 A

[58] Field of Search .............. 308/2 A, 3 R, 26, 72, 308/238, 240, 237 A, 237 R, 244; 267/57.1 R, 57.1 A, 63 R, 63 A, 141.1, 151-154, 141.7, 140.4; 416/134 A, 134 R, 132 A, 132 R; 403/203, 228, 225; 248/603-604, 609, 634, 632; 285/167, 223, 263; 29/149.5, 148.4

[56] References Cited

U.S. PATENT DOCUMENTS

| | | | |
|---|---|---|---|
| 3,020,036 | 2/1962 | Kleinschmidt | 267/57.1 R X |
| 3,169,881 | 2/1965 | Bodine, Jr. | 267/141.1 X |
| 3,200,887 | 8/1965 | Ballauer | 416/134 A |
| 3,282,350 | 11/1966 | Kisovec | 416/134 A X |
| 3,390,899 | 7/1968 | Herbert et al. | 416/134 A X |
| 3,467,353 | 9/1969 | Peterson et al. | 267/141.1 |
| 3,471,207 | 10/1969 | McCloskey | 308/238 X |
| 3,556,673 | 1/1971 | Killian | 416/134 A |
| 3,666,301 | 5/1972 | Jorn | 267/57.1 A X |
| 3,679,197 | 7/1972 | Schmidt | 308/26 X |
| 3,680,895 | 8/1972 | Herbert et al. | 285/223 X |
| 4,068,868 | 1/1978 | Ohrt | 285/263 |
| 4,173,360 | 11/1979 | Bergman et al. | 285/223 X |

FOREIGN PATENT DOCUMENTS

| 498043 | 5/1930 | Fed. Rep. of Germany | 403/228 |
|---|---|---|---|
| 883206 | 3/1943 | France | 403/228 |

*Primary Examiner*—Douglas C. Butler
*Attorney, Agent, or Firm*—Milton E. Gilbert; Gary E. Ross

[57] ABSTRACT

A bearing for carrying compressive radial loads comprising alternating bonded layers of a resilient material of a uniform modulus of elasticity and layers of a non-extensible material, all generally concentrically formed about a common center axis. The fatigue life of the bearing under torsional and compressive loads is enhanced by progressively decreasing both the length and thickness of each layer of resilient material with increasing radii, so that a substantially equal strain is carried across each layer of resilient material in response to each torsional load and the shape factor of each of the layers of resilient material remains substantially constant or increases with increasing radii.

13 Claims, 1 Drawing Figure

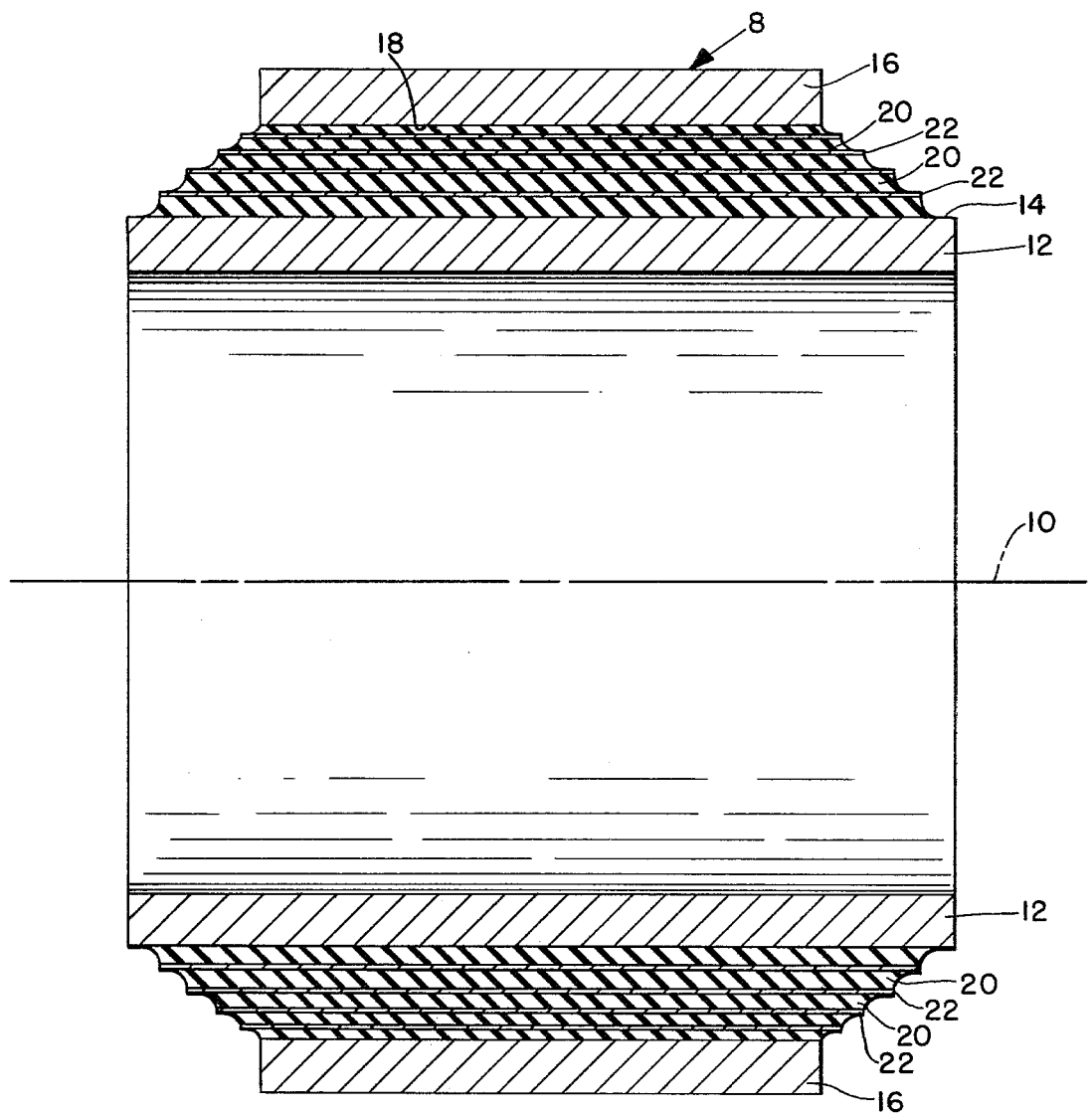

LAMINATED BEARINGS HAVING ELASTOMER LAYERS OF VARYING DIMENSIONS

This invention relates to bearings of the type adapted to carry compressive loads and more particularly to laminated bearings comprising alternating layers of resilient material such as an elastomer and non-extensible material such as a metal.

It is generally well known that incorporating alternating laminae of a non-extensible material between layers of resilient material to form a laminated bearing (1) increases the compressive load carrying capacity of the bearing (with respect to compressive loads applied in a perpendicular direction to the laminae), (2) decreases the yielding capacity and compressive resilience of the resilient material and (3) has little affect on the ability of the resilient material to yield in shear or torsion in a direction of the laminae.

This concept is finding wider commercial acceptance due to the ability of such laminated bearings to carry relatively large compressive loads generally perpendicular to the layers while simultaneously being relatively soft in shear and/or torsion in the direction of the laminae so as to readily accommodate relative movement in designated directions. See U.S. Pat. Nos. 2,051,864; 2,068,279; 2,069,270; 2,126,707; 2,267,312; 2,900,182; 3,179,400; 3,539,170; 3,652,185; and 3,679,197 and the references cited therein, for examples of such bearings and some of their uses.

While the above-described laminating concept may be employed in bearings of a variety of configurations, depending on the compressive loads to be carried and relative movements to be accommodated, many are constructed such that the alternating layers of resilient material and non-extensible material are formed as surfaces of revolution about a common central axis, with successive layers being disposed at successively increasing radii from the axis. These configurations include: (1) cylindrical sections such as shown in U.S. Pat. No. 3,679,197, (2) conical sections such as shown in U.S. Pat. No. 3,652,185, (3) spherical sections as suggested in U.S. Pat. No. 3,679,197, and (4) any other section formed by revolving a line or curve about a common central axis.

Where each layer of resilient material of the laminated bearing is of equal thickness, length and modulus of elasticity, prolonged use of such a bearing in accommodating cyclic torsional movement results in failure from preferential fatigue in the inner most layer, i.e. that layer closest to the common central axis. Accordingly, the fatigue life of such a bearing is typically determined by the stresses and strains established in the inner most layer during use.

This can be conceptually better understood when considering that as well known in the art and as derived in U.S. Pat. No. 3,679,197, the strain carried by any given resilient layer of an elastomeric bearing in a given torsional load application is an inverse function of the product of the effective surface area (A) carrying the compressive load applied perpendicular to the surface area, the average radius (R) from the common center axis to that surface and the modulus of elasticity (G) of the resilient material. More specifically, $$\text{Strain} = \frac{K}{RAG} \quad (1)$$

where K=constant.

Additionally, the shape factor (S.F.) of each layer of resilient material is defined as the ratio of (1) the effective surface area carrying the compressive load applied perpendicular to that surface area and (2) the force-free or bulge area, i.e., the area allowed to move when a compressive load is applied to the load carrying surface area. The shape factor is generally a measure of the ability of a layer of resilient material to accommodate a compressive load. Generally, the greater the shape factor of a particular layer, the greater its ability to accommodate compressive stress. Where, for example, the bearing is of a cylindrical section, the load carrying area (LA.) of each resilient layer is the projected or effective area of the layer when viewing the layer in the direction of the applied load. Thus, for a radially applied load the load carrying area is a rectangular area and is determined as follows:

$$LA = 2RL \quad (2)$$

where
R = the outer radius of the layer from the common central axis to the outer convex surface of the layer; and
L = the length of the layer;
while the force free or bulge area (BA) is those portions of the end surfaces which are under compression. When a radial load is applied, one-half the circumference of each end is under compression so that the bulge free area is determined as follows:

$$BA = 2\pi R tr \quad (3)$$

where
R = the outer radius of the layer from the common central axis to the outer convex surface of the layer; and
tr = the thickness of the layer.
The shape factor of such a layer accordingly reduces to, $$S.F. = \frac{L}{\pi tr} \quad (4)$$

Keeping equations (1) and (4) in mind it will be apparent that in a cylindrical laminated bearing where each layer of resilient material is made of the same material having the same modulus of elasticity, the same length L and thickness tr, the shape factor S.F. will not change from layer to layer, but the strain carried by the innermost layer will be greater than any outer layer due to its having a smaller value of radius R and compressive load carrying surface A. Stated in another way, the product RAG for the inner layer will be smaller and thus the strain larger than the product RAG of the layer spaced at a greater radius.

One solution to this fatigue problem has been advanced in U.S. Pat. No. 3,679,197. Specifically, in order to provide strain across the outer layers equal to or approaching the strain across the inner layers, the patentee suggests that the modulus of elasticity for each layer vary in order that the strain across each layer under a given torsional load application will be approximately equal. More particularly, for a laminated bearing of cylindrical cross-section and length L, the ratio of the strain across a layer n for a given torsional load over the strain across a layer a, is made equal (both strains being made equal) so that the following is derived from equation (1) above:

$$\frac{en}{ea} = \frac{Ra\, Aa\, Ga}{Rn\, An\, Gn} = \frac{2\pi\, RaL\, Ra\, Ga}{2\pi\, RnL\, Rn\, Gn} = 1 \tag{5}$$

which reduces to:

$$\frac{Ga}{Gn} = \frac{Rn^2}{Ra^2} \tag{6}$$

Thus, the patentee of U.S. Pat. No. 3,679,197 concludes that the strain across layers n and a will be equal if the modulus of elasticity varies inversely as the square of the mean radius of the respective layers. Although it is not clear from his analysis, the patentee nevertheless states that it is also advantageous to progressively increase the thickness of the layers of resilient material with increasing radii. By progressively increasing the thickness of the layers of resilient material with increasing radii, the patentee suggests that more resilient material may be radially disposed within the same space with the compressive stresses in the resilient layers maintained within allowable limits. The patentee is therefore of the opinion that the increased amount of resilient material favorably redistributes the shear stresses and strains in torsion to enhance the fatigue life thereof and reduces the number of non-extensible laminae to reduce the overall weight and cost of manufacture. Thus, the patentee concludes that by both progressively increasing the thickness and progressively decreasing the modulus of elasticity of each layer with increasing radii, optimum design can be achieved.

The approach advocated in U.S. Pat. No. 3,679,197 poses several problems, however. Varying the modulus of elasticity of the layers of resilient material requires increased manufacturing time and costs and therefore suffers from disadvantages due to (1) the compounding and batch testing time with respect to each stock material of a particular modulus, (2) the fact that stock calendaring is required, (3) the requirement that the bearing must be assembled by laying up each elastomeric layer separately, typically by hand, (4) the increased chances of metal contamination resulting from a hand lay-up method, (5) the cumulative effect of stiffness tolerance having a more pronounced effect on overall bearing stiffness than if only one material of the same modulus of elasticity were used, and (6) the non-linear variation of strain sensitivity arising from the variation of moduli of elasticity of various elastomers.

Secondly, as will be apparent from equation (4), progressively increasing the thickness of each layer with increasing radius, produces a corresponding decrease in the shape factor of each layer. This, in turn, reduces the ability of each layer of increasing radius to correspondingly accommodate compressive loads.

It is therefore a principal object of the present invention to provide an improved laminated bearing which overcomes the above-noted problems of the prior art bearings.

More specifically, an object of the present invention is to provide an improved laminated elastomeric bearing in which the stresses and strains carried by each layer of resilient material is substantially the same.

Another specific object of the present invention is to provide an improved elastomeric bearing in which the elastomeric layers are all made from a single common stock of the same modulus of elasticity and capable of carrying substantially equal stresses and strains in each of said layers.

These and other objects of the present invention are achieved by a laminated bearing of alternating layers of resilient material and non-extensible material generally arranged concentrically about a common center axis, wherein the length and thickness of the layers of resilient material progressively decrease with increasing radii from the center axis, whereby the resilient layer will be equally strained under compression and torsion loading and the shape factor will remain substantially the same or increase with increasing radius.

Other features and many attendant advantages of the invention are disclosed in or rendered obvious by the following detailed description taken in connection with the accompanying drawing wherein:

BRIEF DESCRIPTION OF DRAWING

The FIGURE is a longitudinal view in cross-section of a bearing made in accordance with the present invention.

Bearings made in accordance with the present invention can best be understood with reference to the analysis provided by equations (1) and (4) above.

More specifically, with respect to equation (1), where the bearing is of a cylindrical configuration, $$A = 2\pi RL \tag{7}$$

where L is the length of each layer and equation (1) becomes, $$\text{Strain} = \frac{K_2}{R^2 LG} \tag{8}$$

where $K_2$ is a constant.

In order to provide a bearing in which a common stock material is utilized, i.e. a resilient material having the same modulus of elasticity is used for all the layers of the bearing, G becomes a constant factor, so that in order to provide substantially equal strain across each of the layers of resilient material equation (8) becomes:

$$R^2 L = \text{constant, or} \tag{9}$$

$$L = \frac{\text{constant}}{R^2} \tag{10}$$

for all of the layers.

It is apparent therefore that the length L is an inverse function of the square of the outer radius of the resilient layer so that the length decreases with increasing radius.

Similarly, it is preferable that the shape factor of each layer of resilient material either remains substantially constant or increases with increasing radius so that the compressive strain for all of the elastomeric layers remains substantially equal. Thus, where the shape factor remains substantially constant, equation (4) becomes, $$\text{constant} \approx (L)/(tr) \tag{11}$$

substituting equation (10), $$tr \approx \frac{\text{constant}}{R^2} \quad (12)$$

so that tr also decreases with increasing radius.

Referring to the FIGURE a typical bearing 8, made in accordance with the present invention, is shown having a general cylindrical shape with a circular cross-section. As illustrated, bearing 8 has a central axis 10 and comprises an inner race 12 having an outwardly facing convex, surface 14 and an outer race 16 having an inwardly facing concave surface 18 radially spaced from the convex surface 14 of race 12. Between and bonded to the surfaces 14 and 18 of the races 12 and 16, respectively, are alternating bonded layers 20 and shims 22 respectively of a resilient material, such as an elastomer and a non-extensible material, such as metal. Each of the layers 20 and shims 22 are concentrically formed around the center axis 10 and each other, and each layer 20 of resilient material has a uniform modulus of elasticity. However, the average length of each layer 20 (length being defined as the dimension component of the layer that lies parallel to axis 10), as well as the thickness of the layer 20 progressively decreases with increasing radii measured from center axis 10. Preferably, the product $R^2L$ of each layer 20 remains substantially constant while the product $R^2tr$ remains substantially constant or increases with increasing radii from center axis 10.

It will be appreciated that by satisfying equation (10) substantially equal shear strains will be carried by each layer 20 when torsional loads are applied to the bearing 8, while satisfying equation (12), substantially equal compressive stresses will be carried by each of the layers 20.

In accordance with the present invention a typical bearing of the type shown in the FIGURE, having five layers 20 which alternate with shims 22 (having a thickness of 0.01 in.) have the following dimensions:

| LAYER | LENGTH (L) (in.) | OUTER RADIUS (R) (in.) | THICKNESS tr(in.) | SF |
|---|---|---|---|---|
| 1 | 1.682 | 0.849 | 0.0300 | 17.85 |
| 2 | 1.557 | 0.889 | 0.0280 | 17.70 |
| 3 | 1.439 | 0.927 | 0.0250 | 18.32 |
| 4 | 1.332 | 0.962 | 0.0220 | 19.272 |
| 5 | 1.232 | 0.994 | 0.0200 | 19.607 |

As one can readily see the length and thickness of each layer 20 decreases with increasing radii. If one computed $R^2L$ for each layer one would find the product for each layer remains substantially constant, i.e., between about 1.21 and 1.24. The shape factor, as shown, remains substantially the same or increases with increasing radii. When the shape factor remains substantially the same the radial compressive loads are equally carried by all of the layers. By making the shape factor of the outer layers greater than the inner layer, outer layer compressive strains resulting from an applied radial load, are reduced.

With this design of the present invention the layers 20 are all of the same material having the same modulus of elasticity. As a result manufacturing time and costs are reduced. The bearing 8 can easily be made, for example, by straight transfer molding. Shims 22 are placed in proper relative relation in a preformed mold, and a stock elastomeric material heated to its liquid state, is poured into the mold. The elastomeric material is allowed to cool, thereby bonding to shims 22 at the predetermined thicknesses and lengths prescribed by equations (10) and (12).

Since a single elastomeric material having a uniform modulus of elasticity is used, the hand lay-up procedure in making a bearing similar to the ones described in U.S. Pat. No. 3,679,197 is not required. Further, since only one stock material is required, compounding and batch testing times are significantly reduced and no stock calendaring is required. Since handling is significantly reduced, the possibility of metal part contamination is less likely than with the hand lay-up procedure. Finally, using more than one elastomeric stock material in a bearing can have a more pronounced effect on overall bearing stiffness and can provide non-linear variations in strain sensitivity (each layer would respond differently to an applied load) than if only one stock material is used as in the present invention.

Since certain changes may be made in the above products without departing from the scope of the invention herein involved, it is intended that all matter contained in the above description or shown in the accompanying drawing shall be interpreted in a illustrative and not in a limiting sense.

What is claimed is:

1. A compressive load carrying bearing comprising alternating layers of a resilient material and a non-extensible material generally concentrically disposed about a common axis, wherein said layers of resilient material have substantially the same modulus of elasticity and the length and thickness of successive layers of resilient material progressively decrease with increasing radii.

2. A bearing according to claim 1, wherein the product $R^2L$, where R is the outer radius and L the length of each layer of resilient material, is substantially the same for each of said layers of resilient material.

3. A bearing according to claim 1, wherein the product $R^2tr$, where R is the outer radius and tr is the thickness of each layer of resilient material, is substantially constant with increasing R.

4. A bearing according to claim 1, wherein each layer of resilient material has a preselected shape factor, the shape factor of each layer of resilient material being substantially the same so that the compressive strain of each layer of resilient material remains substantially constant.

5. A bearing according to claim 1, wherein each of said layers of resilient material has a preselected shape factor, the shape factors of the outermost layers of resilient material being greater than the shape factors of the innermost layers of resilient material so that the compressive strain of each layer of resilient material remains substantially the same.

6. A bearing according to claim 1, wherein the product $R^2tr$, where R is the outer radius and tr is the thickness of each layer of resilient material, increases with increasing R.

7. A bearing according to claim 1, wherein each layer of resilient material has a preselected shape factor, the shape factor of each layer of resilient material increasing with increasing radius.

8. In a bearing for carrying radial compressive loads and having alternating layers of resilient material and shims of a non-extensible material concentrically disposed about a common axis, each of said layers of resilient material having substantially the same modulus of elasticity and being spaced from said axis with an average outer radius R and having an average length L and average thickness tr, wherein the improvement comprises:

said layers of resilient material being dimensioned so that L and tr of each successive layer decrease with increasing R.

9. A bearing according to claim 8 wherein the product $R^2L$ of each of said layers is substantially constant.

10. A bearing according to claim 9 wherein each of said layers of resilient material has a preselected shape factor, the shape factors of said layers of resilient material being substantially the same so that the compressive strain of each layer of resilient material remains substantially constant.

11. A bearing according to claim 10 wherein the product $R^2tr$ of each layer remains substantially constant with increasing R so that the compressive strain of each layer of resilient material remains substantially the same.

12. A bearing according to claim 9, wherein each of said layers of resilient material has a preselected shape factor, the shape factor of each of said layers of resilient material increasing with increasing R.

13. A bearing according to claim 12, wherein the product $R^2tr$ of each layer increases with increasing R so that the compressive strain of each layer of resilient material remains substantially constant.

* * * * *